ate of Patent: Sep. 29, 1987

United States Patent [19]
Gregory

[11] Patent Number: 4,696,203
[45] Date of Patent: Sep. 29, 1987

[54] PUSH-PULL VERNIER CONTROL AND METHOD OF MANUFACTURE THEREOF

[75] Inventor: Ted W. Gregory, Libertyville, Ill.

[73] Assignee: Arens Controls, Inc., Evanston, Ill.

[21] Appl. No.: 648,532

[22] Filed: Sep. 10, 1984

[51] Int. Cl.$^4$ .............................................. F16C 1/10
[52] U.S. Cl. .................................. 74/501 R; 74/502; 74/503
[58] Field of Search ............ 74/501 R, 501 A, 501 M, 74/501 B, 501 C, 501 E, 501 F, 502, 503, 504

[56] References Cited

U.S. PATENT DOCUMENTS

| | | | |
|---|---|---|---|
| 1,983,962 | 12/1934 | Barber et al. | 74/501 R |
| 2,340,830 | 2/1944 | Arens | 74/501 R |
| 2,441,719 | 5/1948 | Potter | 74/501 R |
| 2,644,342 | 7/1953 | Roesch | 74/502 |
| 2,792,720 | 5/1957 | Roesch | 74/502 |
| 3,050,025 | 8/1962 | Atkeson | 74/501 R |
| 3,298,243 | 1/1967 | Geissler et al. | 74/501 R |
| 3,513,719 | 5/1970 | Tschanz | 74/501 P |
| 3,516,299 | 6/1970 | Conrad | 74/501 R |
| 3,643,523 | 2/1972 | Mihaila | 74/503 |
| 3,667,313 | 6/1972 | Young | 74/501 P |
| 4,050,327 | 9/1977 | Thomas et al. | 74/502 |
| 4,161,993 | 7/1973 | Pitrat | 74/501 R |
| 4,238,974 | 12/1980 | Fawcett | 74/501 R |

FOREIGN PATENT DOCUMENTS

| | | | |
|---|---|---|---|
| 593616 | 3/1960 | Canada | 74/501 R |
| 0073582 | 3/1983 | European Pat. Off. | 74/501 R |
| 2501994 | 7/1976 | Fed. Rep. of Germany | 74/501 M |
| 954229 | 12/1949 | France | 74/501 R |
| 447394 | 4/1949 | Italy | 74/501 R |
| 411525 | 6/1934 | United Kingdom | 74/501 R |
| 418749 | 10/1934 | United Kingdom | 74/501 R |
| 1241548 | 8/1971 | United Kingdom | 74/501 R |

OTHER PUBLICATIONS

Computer Symbols, p. A21, McGraw-Hill, Dictionary of Scientific and Technical Terms (1976).

Primary Examiner—Alexander Grosz
Assistant Examiner—Vinh Luong
Attorney, Agent, or Firm—Tilton, Fallon, Lungmus

[57] ABSTRACT

A control assembly primarily intended for use in manually regulating the operating speed of power equipment in which fine adjustments may be obtained by rotating the control knob and rapid changes in speed may be achieved by shifting the knob axially. The assembly includes an outer one-piece sleeve adapted to be mounted upon an instrument panel or engine housing and permanently joined to a flexible casing containing the operating wire or cable. A plunger assembly is rotatably and slidably received within the sleeve, the plunger assembly including a thin-walled plunger tube of flexible material having a control knob ultrasonically welded to one end of the plunger and a swivel connection joining the operating wire at the plunger's opposite end. The swivel connection includes a spherical ball rotatably mounted within the plunger tube for engagement under compressive loads with an enlarged head portion of a swivel connector jointed to the operating wire, the head portion also being rotatably retained within the plunger tube. The side wall of the plunger tube has a generally oval-shaped opening through which a retractable follower (ball) protrudes for engaging the internal threads of the sleeve when vernier adjustment is desired, the width of the opening being slightly less than the diameter of the ball and the ball-retaining edges of the tube defining such width being flexible to allow forceable insertion of the ball into the tube during assembly.

10 Claims, 8 Drawing Figures

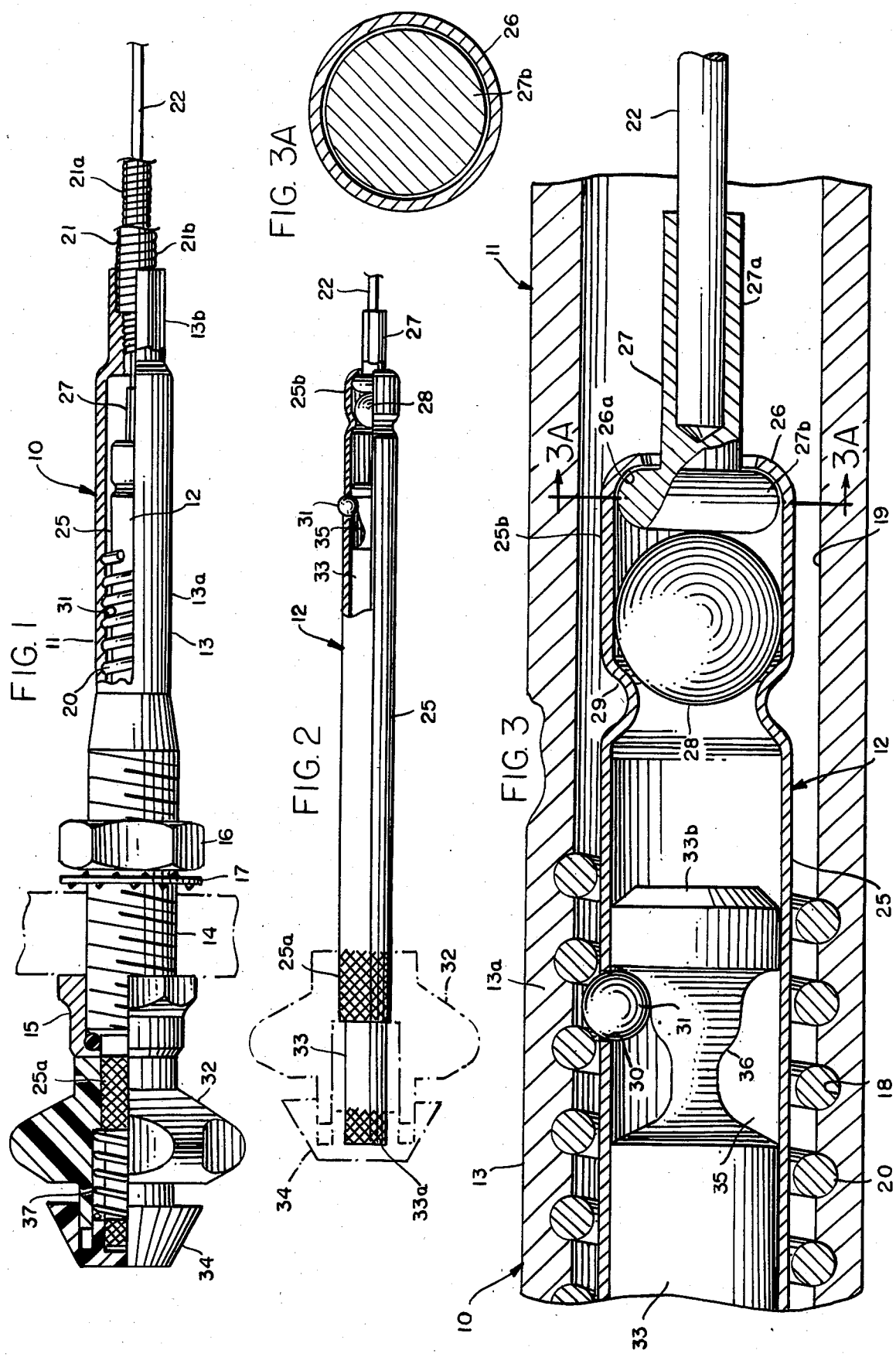

PUSH-PULL VERNIER CONTROL AND METHOD OF MANUFACTURE THEREOF

BACKGROUND AND SUMMARY

Engine controls in which a button-equipped knob may be rotated for fine adjustment of operating speed and in which the knob may also be pushed or pulled axially (after depressing a release button) have been well known for many years. Such a control assembly typically includes an internally-threaded sleeve adapted to be mounted upon a dashboard or other control panel, a flexible tubular casing leading from the sleeve to the engine or other equipment to be regulated, a knob-equipped plunger received within the threaded bore of the sleeve and rotatably connected to an operating wire passing through the flexible casing, and a release button projecting from the knob and operatively connected to a rider (in the form of a ball) that normally protrudes from the plunger and engages the internal threads of the sleeve but retracts when the button is depressed to permit direct axial movement of the plunger within the threaded bore of the sleeve.

Reliability and durability are major requirements for such a control assembly since failure at critical moments during the operation of vehicles, boats, construction equipment, industrial machinery, and any of a wide variety of other types of power-operated equipment may have serious consequences. At the same time, improvements in manufacturing procedures that may result in economies of production and reduced product cost are always important. This invention is concerned with improvements that reduce manufacturing complexities and costs while at the same time yielding a product of superior quality, durability, and reliability. The improvements also yield a product of equal or greater strength despite reductions in size and weight of at least some components.

In prior constructions, the outer sleeves of the control assemblies have been commonly machined from tubing or formed by die casting. In general, such sleeves have been formed in two pieces, one being a main body portion and the other a bushing or connecting part that is joined to both the body portion and to the flexible casing or sheath for the operating wire or cable. The existence of a joint between the body portion and bushing not only presents a point of weakness and potential failure but also an entry point for moisture, particulates, and other contaminants that might precipitate control failure.

Also, in prior constructions the plungers have ordinarily been formed of relatively thick-walled tubing, partly because heavy wall construction was considered necessary to provide material for staking th ball inside the plunger (to prevent it from dropping freely through the side wall opening of the plunger) and for machining threads for subsequent attachment of a knob. Such a staking operation is commonly performed by first pushing the ball through a hole drilled in the wall of the plunger and then staking around the hole in a punch press or the like to permanently deform the hole so that its diameter is sufficiently reduced to prevent exit of the ball. It is believed apparent that such a construction is expensive because of the number of manufacturing steps involved; specifically, the hole must first be drilled and then de-burred. Furthermore, the staking operation is extremely critical and time-consuming as over-staking may prevent the ball from shifting outwardly a sufficient distance for operatively engaging the internal threads of a sleeve and under-staking may leave the ball free to escape through the hole.

A swivel connection between the plunger and the operating wire (or cable) is necessary to prevent rotation of the plunger from being transmitted to the operating wire. Twisting of the wire is clearly undesirable because of the resistance to knob rotation and the recoil effect, and because such twisting may cause wear, stresses, and premature failure. Previous constructions have commonly used either multi-ball type swivels or crude ball and socket type constructions. Exposed ball-socket arrangements present a greater risk of failure because of their exposure to dirt and other contaminants, but internal swivel constructions have in the past been relatively expensive to manufacture and have not always provided free swivel action under both compression and tension loads.

Finally, prior constructions have ordinarily utilized knobs that are either threaded onto the plungers or are injection molded onto the plungers. Threaded constructions are not only relatively expensive but present the possibility of loosening in use. Injection molding, on the other hand, necessarily involves a comparatively long cycle, thereby lengthening assembly time and increasing product cost.

The control assembly of this invention greatly reduces such complexities and costs while at the same time achieving a superior product. Briefly, the sleeve is formed in one piece rather than two by impact extrusion, thereby eliminating some of the machining operations and all of the assembly operations of prior two-piece structures, reducing the amount of material required (since no material is required for a press fit or staking operation between two pieces the resultant sleeve may be shorter in overall length), increasing the strength and durability of the part because of the absence of a joint and of an entry point for contaminants, and yielding an increase in density in the neck portion of the sleeve where stresses are concentrated and the porosity of die casting is eliminated.

The plunger assembly of this invention eliminates the need for drilling, de-burring, and staking, and thereby permits the use of relatively thin-wall tubing. Instead of drilling a circular opening, then de-burring that opening, and finally reducing its size by staking after insertion of the ball, an oval or elliptical opening is punched or perforated in the tube wall, such opening having its smaller dimension only slightly less than the diameter of the ball so that the ball may be "snapped" through the hole of the flexible wall of the plunger tube at the time of assembly. Not only does such a procedure eliminate the relatively time-consuming and expensive steps of drilling, de-burring, and staking, but the final result is a product in which dimensions may be more easily and precisely controlled to insure ball retention without preventing the ball from protruding sufficiently for operation in an assembled unit.

The use of thin wall tubing for the plunger also leads to an improved swivel in which a connector secured to the operating wire and provided with an enlarged head portion is retained within the distal end of the plunger by rolling inwardly the material at the end of the plunger to define a gradually curved (when viewed in longitudinal section) annular bearing surface. A spherical element or ball is staked within the plunger to engage the opposite side of the head. The result is a construction in which the head bears against the spherical surface of the ball under compression loads and against the curved annular surface of the plunger under tension loads and, in either case, provides a construction offering low resistance to rotation of the plunger relative to the operating wire or cable.

It has been found that the complexities and expenses of providing a threaded or injection-molded mounting of a knob upon a plunger may be greatly reduced by ultrasonically welding a pre-formed knob onto the knurled end of a plunger. An extremely secure connection is achieved between the knob and plunger (and between the push button and the actuating member on which it is mounted) without the extended machining and/or molding operations characteristic of earlier constructions.

Other features, objects, and advantages of the invention will become apparent from the specification and drawings.

DRAWINGS

FIG. 1 is a side elevational view of a control assembly embodying the invention, the assembly being shown partly in section.

FIG. 2 is an elevational view of the plunger assembly separated from the remainder of the complete control device, the plunger assembly being shown partly in section.

FIG. 3 is an enlarged sectional view of the distal portion of the sleeve and plunger assembly illustrating the relationship of parts.

FIG. 3A is a cross sectional view taken along line 3A—3A of FIG. 3.

Figure 6:
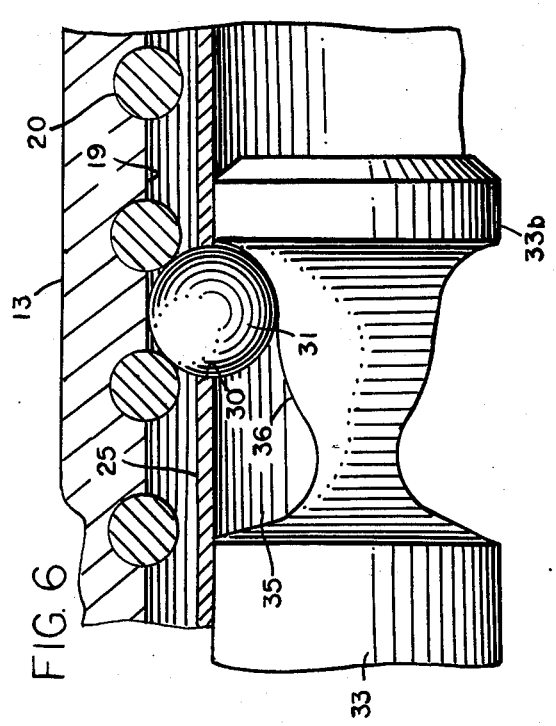
Figure 7:
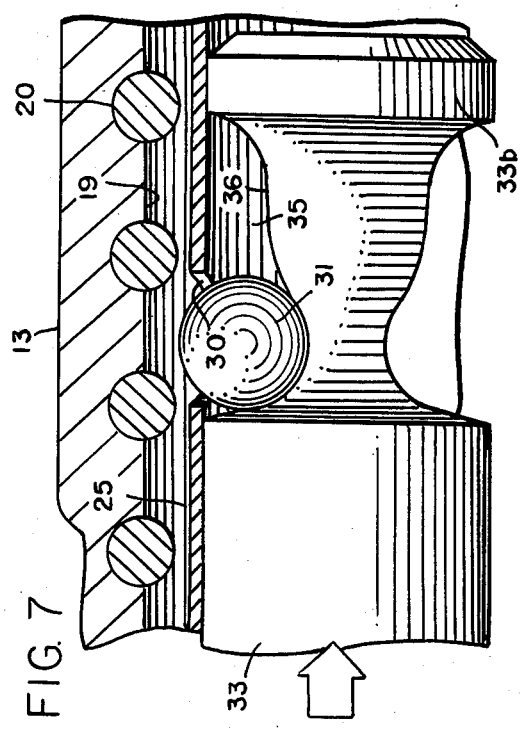

FIGS. 6 and 7 fragmentary sectional views illustrating the ball and actuator member in different positions of adjustment, with FIG. 6 depicting the ball in position for vernier adjustment and FIG. 7 illustrating the ball in position for push-pull operation.

DETAILED DESCRIPTION OF PREFERRED EMBODIMENT

Referring to the drawings, the numeral 10 generally designates a control assembly which in turn is composed of two main components, a sleeve assembly 11 and a plunger assembly 12. The sleeve assembly constitutes the housing for the unit and is adapted to be mounted upon a dashboard or other control panel. Assembly 11 takes the form of a tubular sleeve 13 having a main body portion 13a and a neck portion 13b. The proximal end of the sleeve is externally threaded at 14 to support faceplate nut 15, jam nut 16, and lock washer 17. It is believed apparent that by tightening jam nut 16 against the backside of a control panel (shown in phantom) through which sleeve 11 extends, the sleeve may be securely fixed in position with respect to that panel.

The sleeve may be internally threaded in any suitable manner. Since such threads must be bur free for smooth operation of the control assembly, it has been found that the internal threading may be effectively and economically achieved by cutting a spiral groove 18 in the bore 19 of the sleeve and then threading a coil spring 20 into the spiral groove as shown most clearly in FIG. 3.

Of particular importance is the fact that neck portion 13b and body portion 13a are integrally formed, unlike prior constructions where the neck portion or bushing is staked or otherwise secured to a separate body portion.

It has been found that the illustrated construction may be readily formed in one piece by impact extrusion and the increase in density of the neck portion 13b where stresses are concentrated results in even greater strength of the unitary part.

As shown in FIG. 1, the neck portion 13b is swaged, preferably in an octagonal configuration, about one end of a conventional tubular flexible casing 21 that serves as a guide for operating wire (or cable) 22. The casing and wire are adapted to be connected at their distal ends to the equipment intended to be controlled by assembly 10, all as well known in the art. Casing 21 consists of a helical coil spring 21a ensheathed in a flexible covering of high density polyethylene or other suitable polymeric material.

The plunger assembly 12 is shown clearly in FIGS. 2 and 3 and includes a plunger tube 25 formed of a tough and at least somewhat flexible metal such as stainless steel or carbon steel. The tube 25 is generally cylindrical in configuration and except as noted hereafter has generally uniform external and internal dimensions along its full length. The external surface of the tube's proximal end 25a is knurled or provided with surface undulations as shown in FIGS. 1 and 2. At its distal end 25b the tube is rolled or turned inwardly to provide an annular retention flange 26 and bearing surface as will be described in detail hereinafter. Such rolling of the tube's distal end, and other changes in the wall of the tube, are possible because of its thin-wall construction. For example, for a stainless steel tube having an outside diameter of approximately 0.44 inches, a wall thickness of approximately 0.03 inches has been found effective.

In the final assembly, plunger 12 must be capable of turning freely without twisting the operating wire (or cable) 22. The proximal end of the operating wire is equipped with a connector 27 having a tubular portion 27a receiving and swaged about, or otherwise permanently connected to, the proximal end of the wire. Connector 27 also has an enlarged head portion 27b received within the distal end of plunger tube 25. Head portion 27b is circular in cross section and has a fully rounded periphery when viewed in longitudinal section or elevation (FIG. 3 and 3A). The rounded periphery of the head portion engages the rounded inside bearing surface 26a of annular flange 26. The flattened proximal surface of the head is engagable with the surface of a spherical retention element or ball 28 secured in place within the distal end of the plunger tube by an annular indentation 29 formed in the wall of the tube on the proximal side of the ball (FIG. 3). The plunger tube is therefore free to rotate relative to connector 27; in the event that such rotation must occur under compressive loading, frictional resistance is minimized by the limited bearing contact between the spherical surface of ball 28 and the proximal surface of head portion 27b, and in the case of tension loading, resistance is minimal because of the limited contact between head 27b and annular bearing surface 26a.

An opening 30 is punched or perfed (not drilled) in the side wall of plunger tube 25 near the distal end thereof and a rider in the form of ball 31 normally protrudes through that opening as shown in FIG. 3. In that position, ball 31 is engagable with the threads defined by coil spring 20 and prevents direct (non-rotative) reciprocation of the plunger within sleeve 13. Advancement or retraction of the plunger may be achieved under such conditions only by threading the plunger inwardly or outwardly by rotating control knob 32. Since such rotation of the knob results in only gradual advancement or retraction of the control wire 22, such operation may be referred to as a vernier action used for fine throttle adjustments. However, when ball 31 is radially retracted so that it may clear the threads defined by coil spring 20, the user may shift plunger 12 axially inwardly or outwardly (distally or proximally) without rotation for rapid changes in the operation of the equipment to which the control 10 is connected.

Retraction of the ball or spherical element 31 is achieved by shifting an actuating member 33 inwardly or distally as shown in FIG. 7. The actuating member 33 takes the form of a cylindrical rod that is slidably received within the bore of plunger tube 25. The proximal end 33a of the rod is knurled and a push button 34 is permanently mounted thereon. At its opposite distal end 33b the actuating member has an annular recess 35 with a cam surface 36 of developed shape. When the actuating member is in its normal position, as controlled by coil spring 37 extending about the proximal end of the actuating member between knob 32 and button 34, the ball is cammed or wedged radially outwardly into the position depicted in FIGS. 3 and 6. When the actuating member is urged forwardly—that is, when button 34 is depressed—ball 31 drops into the deeper portion of the recess and no longer protrudes sufficiently through opening 30 to impede reciprocatory movement of the plunger 12 within the threaded bore of sleeve 13.

Figure 5:
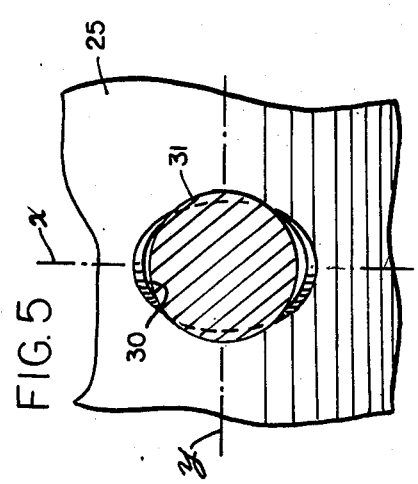
FIG. 5 is a fragmentary sectional view taken along line 5—5 of FIG 4.

An important aspect of the invention lies in the fact that opening 30 is of oval or elliptical configuration. As shown in FIG. 5, opening 30 is oriented with its major or longer axis x extending in a plane normal to the longitudinal axis of plunger tube 25 and with its minor or shorter axis parallel with the plunger tube's longitudinal axis. Of particular importance are the facts that while the greater dimension or length of opening 30 exceeds the diameter of ball 31, the width of the opening measured along its minor axis is slightly less than the ball diameter. Therefore, once the ball 31 is located within plunger tube 25, and within the recess 35 of actuating member 33, it will remain captured within that recess even if the plunger assembly 12 should be removed from sleeve assembly 11 (as would commonly occur during installation of the control assembly 10).

Figure 4:
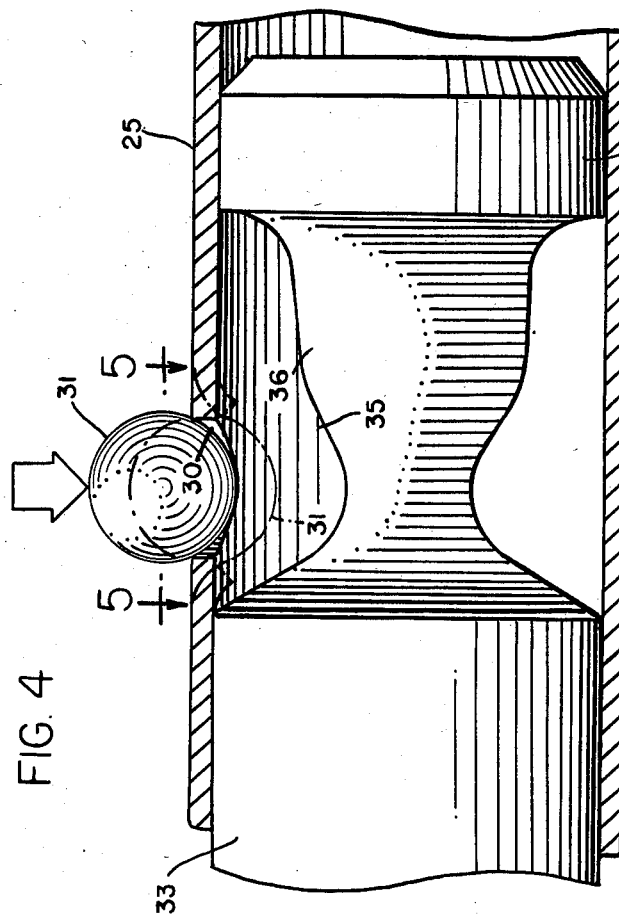
FIG. 4 is a still further enlarged fragmentary sectional view illustrating a step in the manufacture of the assembly when the ball is being inserted into the plunger assembly.

The dimensional difference is such that during manufacture of the plunger assembly ball 31 may be forceably driven through opening 30 with the arcuate edges of that opening flexing inwardly to permit passage of the ball as indicated in broken lines in FIG. 4. Once the major portion of the ball has passed through the opening, the lips or edges of the flexible plunger tube defining opening 30 return to their original condition and prevent retrograde movement of the ball. Therefore, because of the thin wall construction of the plunger tube and the flexible spring-like material from which it is formed, ball 31 may be easily inserted and retained within the plunger tube without the usual steps of drilling, de-burring, and staking encountered in the prior art. Since the dimension of ball 31 and the dimensions of opening 30 may be precisely controlled, the dangers of unacceptable variations in the size differential, resulting in a ball that is either free to escape or unable to move radially outwardly a distance sufficient to engage the internal threads of the sleeve, are avoided. While the dimensional difference in any preferred construction will vary depending on the size of the parts and the materials involved, it has been found that where a plunger tube is formed of stainless steel and dimensioned as described above, effective results are obtained if the elliptical opening has a dimension along its minor axis of 0.1710 inches and the stainless steel spherical element or ball has a diameter of 0.1719 inches.

Mounting of knob 32 and button 34 upon the knurled portions 25a and 33a of the plunger tube and actuating member, respectively, may be readily achieved by forming the knob and button from a suitable thermoplastic material such as ABS (acrylonitrile butadiene styrene), fitting the parts upon their respective supports, and then ultrasonically welding them in place. The ultrasonic welding causes fluidization of that stratum of the knob and button in contact with the knurled surfaces so that upon solidification the knob 32 is permanently anchored to plunger tube 25 and button 34 is similarly fixed to actuating member 33.

While in the foregoing I have disclosed an embodiment of the invention in considerable detail for purposes of illustration, it will be understood by those skilled in the art that many of these details may be varied without departing from the spirit and scope of the invention.

I claim:

1. A control assembly comprising an elongated sleeve having a threaded bore; a plunger assembly including a thin-walled cylindrical plunger tube slidably and rotatably received within said bore; said plunger tube having proximal and distal ends; a control wire equipped at one end wih a swivel connector having an enlarged head portion rotatably received within the distal end of said plunger tube; an entirely spherical ball mounted within said plunger tube proximal to said head and providing a spherical surface engagable with said head for low resistance to independent relative rotation of said connector and plunger tube under compression loads; said plunger tube curving inwardly and distally about said head to provide an annular flange having a smooth annular bearing surface engagable with said head for low resistance to relative rotation of said connector and plunger tube under tension loads; said head being circular in transverse section and having rounded peripheral bearing surfaces when viewed in longitudinal section.

2. The assembly of claim 1 in which said plunger tube is provided with annular indentation engagable with said ball for limiting proximal movement of the same within said plunger tube.

3. The assembly of claim 1 in which said thin-walled plunger tube is of substantially uniform thickness throughout its entire extent.

4. The assembly of claim 1 in which said sleeve has an integrally formed reduced neck portion at one end thereof; said neck portion tightly and immovably receiving and retaining one end of a flexible casing extending about said control wire.

5. The assembly of claim 4 in which said sleeve and integral neck portion are impact extruded.

6. A control assembly comprising an elongated sleeve having a threaded bore; a plunger assembly including a thin-walled cylindrical plunger tube slidably and rotatably received within said bore; said plunger tube having proximal and distal ends; a control wire equipped at one end with a swivel connector having an enlarged head portion rotatably received within the distal end of said plunger tube; a ball mounted within said plunger tube proximal to said head and providing a spherical surface engagable with said head for low resistancee to independent relative rotation of said connector and plunger tube under compression loads; said plunger tube curving inwardly and distally about said head to provide an annular flange having a smooth annular bearing surface engagable with said head for low resistance to relative rotation of said connector and plunger tube under tension loads; said plunger tube having a perforated noncircular opening in the wall thereof; a spherical member disposed within said tube having diameter smaller than said opening when measured in a first direction but larger than said opening when measured in a second direction; said spherical member being movable radially between an inwardly-displaced inoperative position and an outwardly-displaced operative position in which said member projects outwardly through said opening and is engagable with the the threads of said bore; and means for selectively shifting said member in radial directions within said tube.

7. A control assembly comprising an elongated sleeve having a threaded bore; a plunger assembly including a thin-walled cylindrical plunger tube formed of flexible material and slidably and rotatably received within said bore; said plunger tube having a perforated oval opening in the wall thereof; a spherical member disposed within said tube having a diameter smaller than the dimension of said oval opening measured along its major axis but larger than the dimension of said opening measured along its minor axis; said spherical member being movable radially between an inwardly-displaced inoperative position and an outwardly-displaced operative position in which said member projects outwardly through said oval opening and is engagable with the threads of said bore; and means for selectively shifting said member in radial directions within said tube.

8. The assembly of claim 7 in which said oval opening has its short axis aligned with the longitudinal axis of said plunger tube.

9. The assembly of claim 7 in which said thin-walled plunger tube is of substantially uniform thickness throughout its entire extent.

10. A control assembly comprising an elongated sleeve having a threaded bore; a plunger assembly including a thin-walled cylindrical plunger tube formed of flexible material and being slidably and rotatably received within said bore; said plunger tube having a generally oval-shaped opening in the wall thereof; said opening having a length greater than its width; a spherical member disposed within said tube having a diameter smaller than the length of said opening but larger than the width thereof; said spherical member being movable radially between an inwardly-displaced inoperative position and an outwardly-displaced operative position in which said member projects outwardly through said opening and is engagable with the threads of said bore; and means for selectively shifting said member in radial directions within said tube; said material of said plunger tube being capable of flexing for increasing the width of said opening to allow forceful insertion of said spherical member there-through during assembly operations and thereafter returning to unflexed condition for retaining said spherical member within said plunger tube.

* * * * *